(12) United States Patent
Newball et al.

(10) Patent No.: US 6,334,628 B1
(45) Date of Patent: Jan. 1, 2002

(54) CEILING RETRACTABLE THREE POINT SEAT BELT SYSTEM

(75) Inventors: Albert Newball, Worthington; Kathleen Lathrop, Dublin, both of OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/560,354

(22) Filed: Apr. 28, 2000

(51) Int. Cl.[7] .................................................... B60R 22/00
(52) U.S. Cl. ...................... 280/801.1; 280/808; 297/481; 297/483
(58) Field of Search .................. 280/801.1, 808; 297/468, 481, 483

(56) References Cited

U.S. PATENT DOCUMENTS

| | | | | |
|---|---|---|---|---|
| 3,819,197 | A | * 6/1974 | Shakespear | |
| 4,289,328 | A | * 9/1981 | Repp et al. | 280/808 |
| 4,568,107 | A | 2/1986 | Biviano | 280/808 |
| 6,116,696 | A | * 9/2000 | Widman et al. | 280/808 |
| 6,234,529 | B1 | * 5/2001 | Ellison et al. | 280/808 |

FOREIGN PATENT DOCUMENTS

| | | | |
|---|---|---|---|
| DE | 3335203 | * | 5/1985 |
| FR | 2701906 | * | 9/1994 |
| JP | 6-156186 | | 6/1994 |
| JP | 9-39733 | | 2/1997 |
| JP | 10-79546 | | 3/1998 |

* cited by examiner

Primary Examiner—Eric Culbreth
(74) Attorney, Agent, or Firm—Armstrong, Westerman, Hattori, McLeland & Naughton, LLP

(57) ABSTRACT

A ceiling retractable three point seat belt system for restraining a passenger in a vehicle seat includes a seat belt webbing having a first end connected to a retractor secured to the vehicle, a first buckle anchored to the vehicle and disposed on one side of the passenger, and a second buckle anchored to the vehicle and disposed on an opposite side of the passenger. Further, a first latch member is connected to a second end of the seat belt webbing, remote from the first end, wherein the first latch member has a first tongue plate engageable with the, first buckle. A second latch member has a webbing loop, through which the seat belt webbing is threaded, such that the second latch member is slidable along the seat belt webbing, from the first latch member toward the retractor. The second latch member has a second tongue plate engageable with the second buckle.

7 Claims, 8 Drawing Sheets

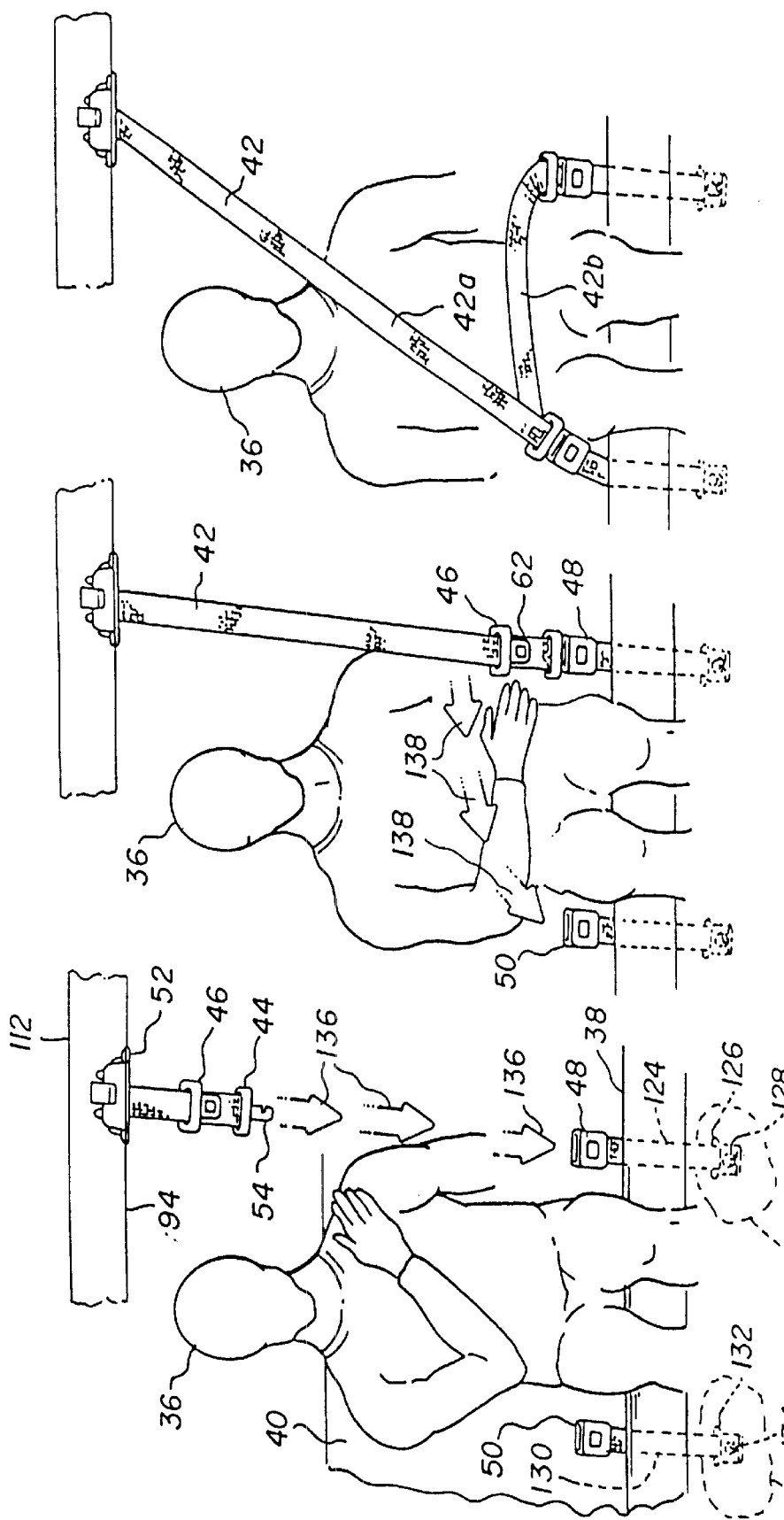

CEILING RETRACTABLE THREE POINT SEAT BELT SYSTEM

BACKGROUND OF THE INVENTION

1. Field of the Invention

This invention is directed to a seat belt system for use in a vehicle. More specifically, it is directed to a ceiling retractable seat belt system for use in a vehicle. Even more specifically, it is directed to a ceiling retractable seat belt system for use in a center seat of a motor vehicle.

2. Prior Art

In current seat belt systems, motor vehicles often use three passenger seats, in which a center passenger must be belted in as safely as an outside passenger. Normally, in a motor vehicle, a three point seat belt, among other things, is used to restrain a passenger in place in the event of an accident or other unusual motion of the motor vehicle. In most motor vehicles, an outside passenger, that is a passenger immediately adjacent the right or left hand side of the motor vehicle, will use a three point seat belt which is retracted into the side of the vehicle nearest that passenger. Most commonly in use today is a single latch member which slides along a loop of seat belt webbing which is anchored on one end at an upper portion of the vehicle (generally near the ceiling) and at the other end at a lower portion of the vehicle (generally near the floor). A retractor is positioned at one end of the loop. As the latch member is pulled across the passenger's body and buckled into the buckle, the lap belt stretches across the passengers lap or hips and the shoulder belt thus extends from the latch member up across the front torso of the passenger, between the passenger's shoulder and head, and into a retractor.

A problem occurs with the seat belt for the center passenger. The upper part of the seat belt loop will normally be anchored in the ceiling. However, in this case, the seat belt webbing will stretch down from the ceiling and be in the way, when not in use.

In vehicles such as a sport utility vehicle (SUV), a van or minivan, a station wagon, or any other type of vehicle, a second or third row of seats often have the ability to fold down to increase cargo capacity. In such a vehicle, the center passenger in a second or third row seat will usually retrieve his shoulder belt from a mounting position in the ceiling of the vehicle. In such arrangement, it is preferable to have the belt retracted into the ceiling in order to be out of the way when not in use, and to allow the seat to be conveniently folded away when so desired. Thus, in the past, it has been difficult to make a three point seat belt for the center passenger convenient to use.

For example, a conventional type of three point seat belt for passenger in a center seat is illustrated in FIGS. 1(a)–1(e). Specifically, as seen in FIG. 1(a), seat 11 includes a seat cushion 12 and a seat back 14. The three point seat belt 15 includes lap belt 16 and shoulder belt 18. Lap belt 16 is anchored on one end thereof at anchor 30. The opposing end of the lap belt has a latch member 27 with tongue plate 26. The lap belt is adjustable with respect to latch member 27 by pulling end strap 17 of the lap belt.

As also seen in FIGS. 1(b)–1(e), the shoulder belt 18 is biased into a retracted state by a retractor (not shown) located above the ceiling of the vehicle, or in some other convenient place. A shoulder belt cover 32 provides an opening through which the shoulder belt 18 extends into the passenger compartment from the retractor (not shown). The hook plate 22, connected to the end of should belt 18 is stowed in the shoulder belt cover 32 when not in use. When this three point seat belt is to be used, the shoulder belt 18 is pulled down from its stowed position by hook plate 22. Hook plate 22 is then hooked into eye plate 28 of lap belt 16. Eye plate 28 extends rearwardly from the main portion of latch member 27 of lap belt 16. Once hook plate 22 is properly hooked into eye plate 28, latch member 27 of lap belt 16 is then drawn across the body of the passenger (see FIG. 1(d)) and tongue plate 26 is latched into buckle 24 which is anchored to the floor of the vehicle or some other appropriate place.

As shown in FIG. 1(e), the end strap 17 of lap belt 16 is pulled away from the buckle 24 to provide tension on the lap belt 16 for a proper fit for the passenger. Tension is provided on shoulder belt 18 by the retractor (not shown). Thus, this prior art belt system enables the shoulder belt stowed in the ceiling. The lap belt is not retracted and thus causes clutter on the seat cushion when not in use. Furthermore, the use of this three point seat belt system includes at least pulling the shoulder belt 18 down from the cover 32; latching hook plate 22 with eye plate 28; pulling latch member 27 across the passenger's body; latching it into buckle 24; and then tightening the lap belt by pulling on end strap 17. This conventional system is cumbersome to put on and is thus less likely to be used by the passenger.

SUMMARY OF THE INVENTION

The instant invention is intended to overcome the inconvenience of use of the conventional three point seat belt described above. Specifically, a three point seat belt system is provided which is convenient to use and yet retracts into the ceiling when not in use.

A three point seat belt system in accordance with the instant invention is ideal for use with a center seat in a second, third or another row of seats in a motor vehicle. For the purposes of this discussion, a center seat is any seat that t is not immediately adjacent the side of the vehicle. For example, in a van with seats for four passengers, the two seats in the middle,would be considered to be center seats. Me three point seat belt system in accordance with the instant invention includes a seat belt webbing having a first end connected to a retractor secured to the body of the motor vehicle, a first buckle anchored to the vehicle and disposed on one sidle of a passenger, and a second buckle disposed on the opposite side of the passenger. A first latch member is connected to seat belt webbing, remote from the end, wherein the first latch member has a tongue plate engageable with the first buckle. A second latch member has a webbing loop, through which said seat belt webbing is threaded, is slidable along the seat belt webbing from the first latch member toward said retractor, and a second tongue plate engageable with the second buckle.

It is preferable that the first tongue plate of the f first latch member is engageable only with the first buckle and the second tongue plate is engageable only with the second buckle, since, in this three point seat belt system, the first tongue plate is first latched into the first buckle and then the second tongue plate is drawn across the passenger's body and latched into second buckle. It is thus preferable that the first and second tongue plates be different in shape so that there is no possibility of buckling the first tongue plate into the second buckle and the second tongue plate into the first buckle, thus causing an improper arrangement of the three point seat belt which would not properly protect the passenger.

It is an object of the instant invention that a ceiling retractable three point seat belt be convenient for a passenger to put on. According to the instant invention, the passenger simply pulls the first and second latch members from their respective stowed positions in the belt cover, and pulls the first latch member down and latches it into the first buckle. Next, the second latch member is pulled across the passenger's body (along with the seat belt webbing) and latches it into the second buckle. There is no need to do any further tightening of the belt as in the prior art, described above.

It is an object of the instant invention that the three point seat belt system be easily stowable when not in use. In accomplishing this, the seat belt webbing is retracted by a retractor into a belt cover positioned in the vehicle ceiling. In the belt cover, two slots are provided, one each for the first tongue plate and the second tongue plate. Each slot has a spring clip inside thereof to secure the first or second tongue plate when inserted. Thus, when the three point seat belt system is not in use, the first tongue plate is stowed in its slot and secured therein by a spring clip, and the second tongue plate is stowed in its slot in the belt cover and secured therein by a spring clip. The retractor retracts the remaining slack in the seat belt webbing into the retractor. When the seat belt is to be used, it is easy for a passenger to simply pull the first and second latch members from their stowed positions in the belt cover and properly latch the belts.

It is another object of the instant invention, in a three point seat belt system with two latch members and two buckles, that the latch members be prevented from being latched into the wrong buckle. In order to provide latch members which may only be buckled into the proper buckle, the first tongue plate of the first latch member has a notch formed in one side thereof, while the second tongue plate of the second latch member has a center aperture formed therein. The first buckle has a buckling mechanism which corresponds and cooperates with the notch in the first tongue plate, while the second buckle has a buckling mechanism which corresponds and cooperates with the second tongue plate. Because of this arrangement, the first tongue plate, with a notch in it, cannot be buckled into the second buckle which is designed for a tongue plate having a center aperture. Accordingly, the second tongue plate, having a center aperture, cannot be buckled into the first buckle which has a mechanism which corresponds and is cooperate with the notch in the first tongue plate. Thus, it is impossible to buckle the first latch member or the second latch member into the wrong buckle. Therefore, it is possible to prevent incorrect buckling of the latch members so that a proper wearing of the seat belt is promoted

BRIEF DESCRIPTION OF THE DRAWINGS

FIGS. 3(a)–3(c) illustrate the three point seat belt system in accordance with the instant invention in use by a passenger;

DETAILED DESCRIPTION OF THE INVENTION

Figure 1A:
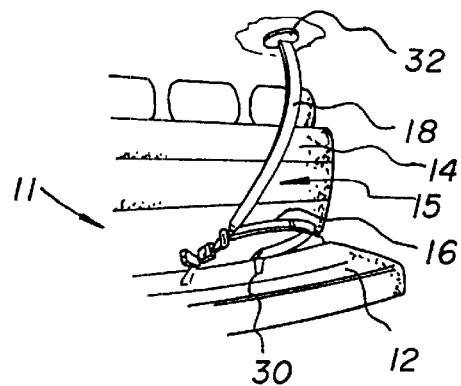
FIGS. 1(a)–1(e) illustrate a prior art three point seat belt system.
Figure 1B:
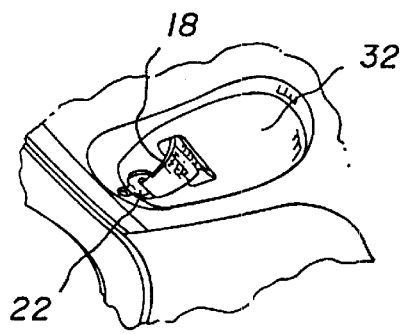
Figure 1C:
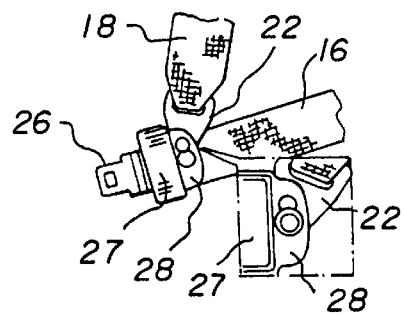
Figure 1D:
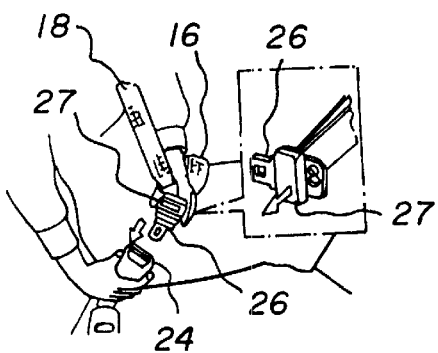
Figure 1E:
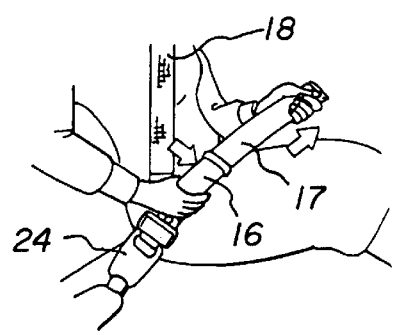
Figure 2A:
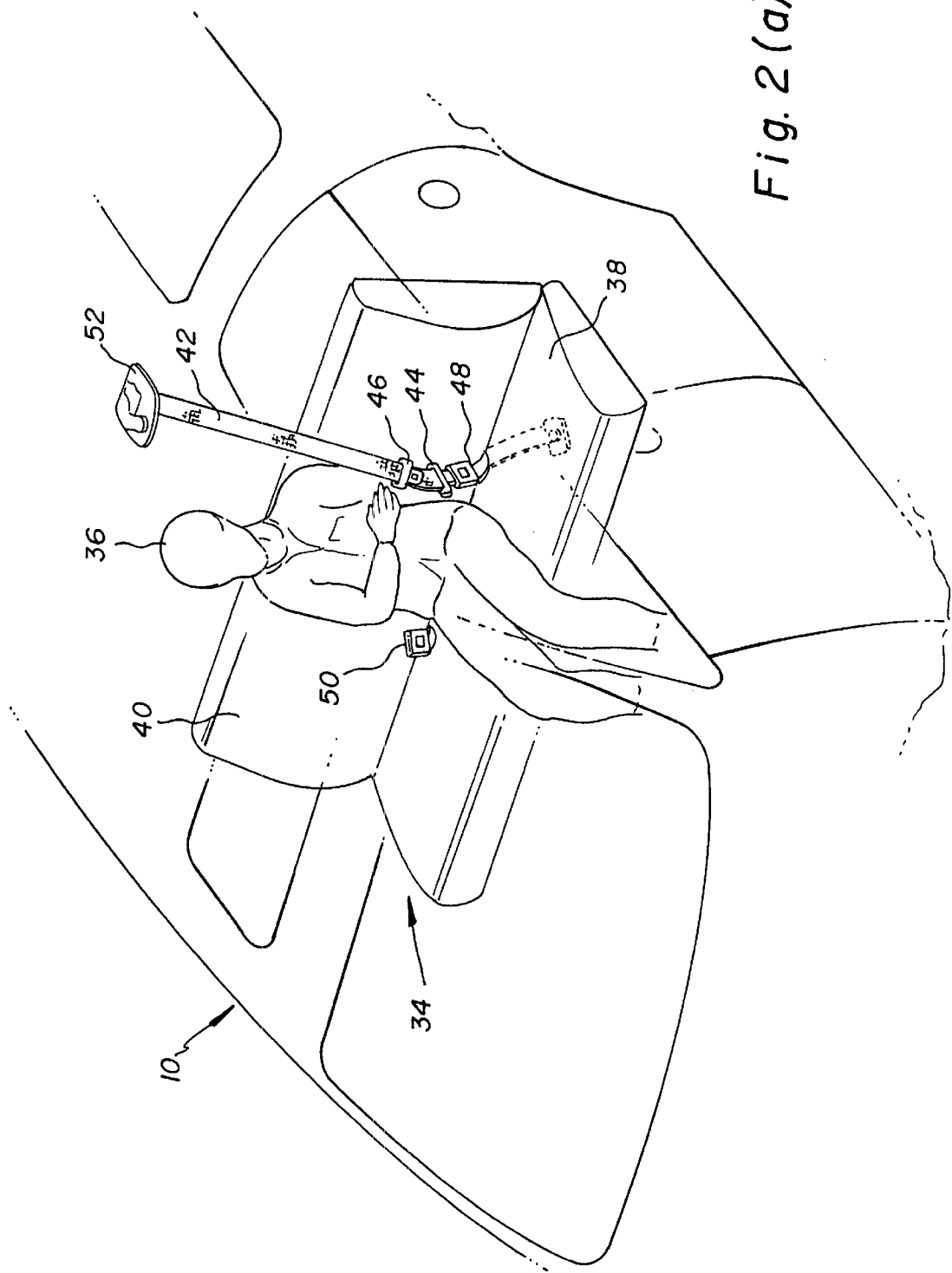
FIGS. 2(a) and 2(b) illustrate a three point seat belt in accordance with the instant invention, as used in a motor vehicle.
Figure 2B:
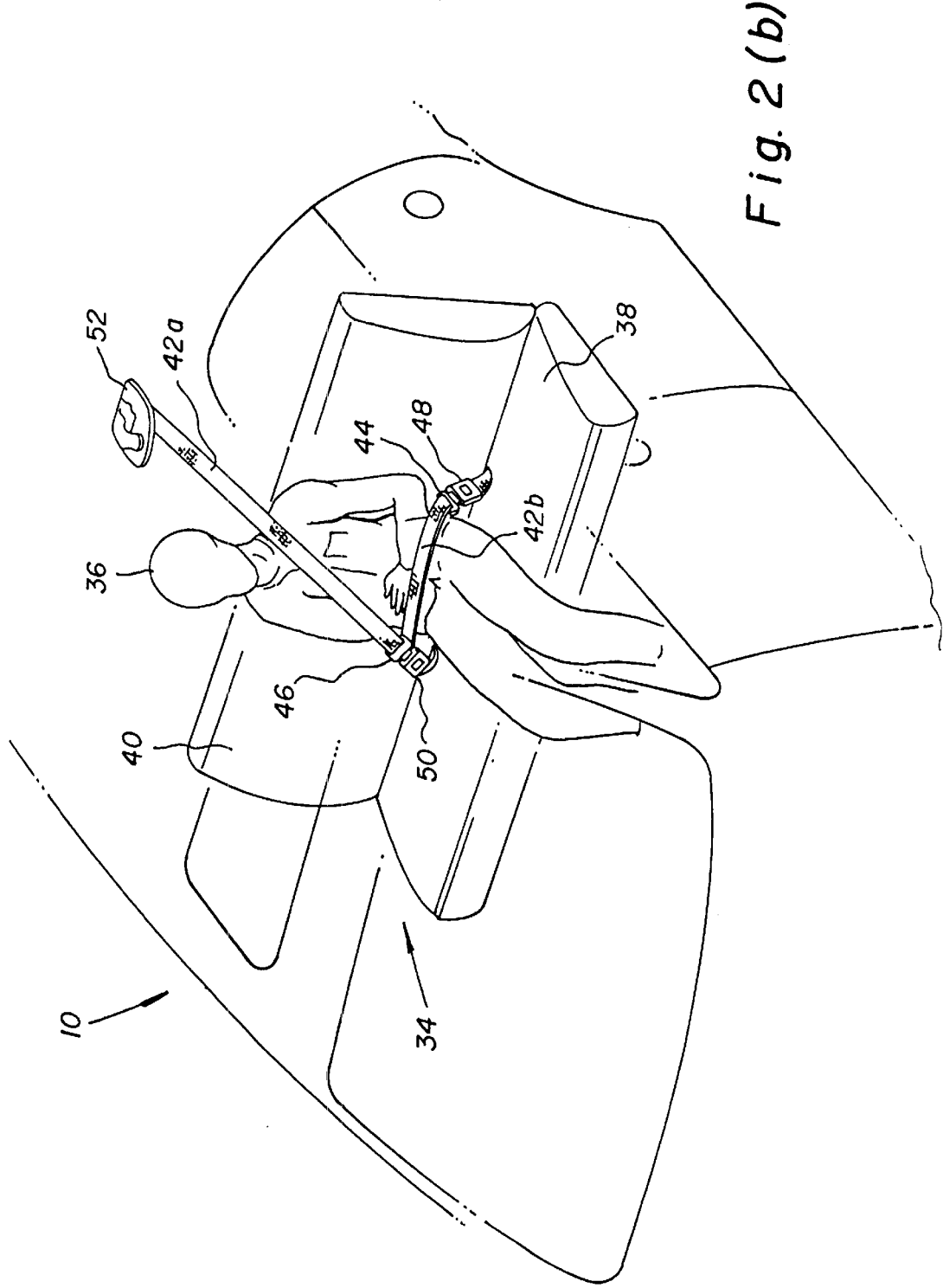
Figure 4:
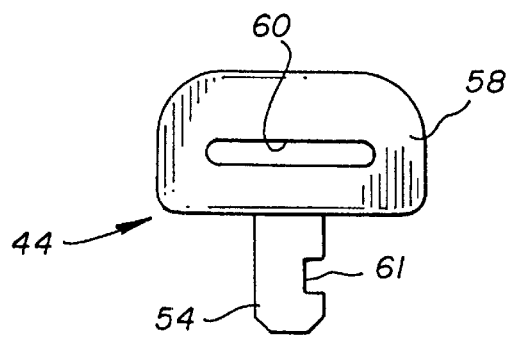
FIG. 4 illustrates the first latch member as used in the instant invention.

In accordance with the instant invention, FIGS. 2(a) and 2(b) illustrate the ceiling retractable three point seat belt system as used in a motor vehicle. FIG. 2(a) illustrates the first latching step and FIG. 2(b) illustrates the second latching step. Specifically, as shown in FIGS. 2(a) and 2(b), in a vehicle 10, a passenger 36 is shown in the center position of second row seat 34. The front seats are not shown in this illustration for simplicity. The second row seat 34 is comprised of a seat cushion 38 and seat back 40. In some vehicles, seat back 40 may be folded down, sometimes in conjunction with the folding of seat cushion 38, for additional cargo carrying capacity. In FIG. 2(a), a seat belt webbing 42 extends downwardly from belt cover 52 which is disposed in the ceiling of vehicle 10. A first end of belt webbing 42 is secured to a portion of the vehicle 10 by way of a retractor (not shown in FIG. 2(a)). The second end of webbing 42 (remote from the first end) is affixed to first latch member 44. First latch member 44 is illustrated in FIG. 4. As shown in FIG. 4, first latch member 44 comprises a tongue plate 54 and a webbing loop 58. Webbing loop 58 has a webbing opening 60 through which a seat belt webbing is threaded. Tongue plate 54 has a notch 61 formed therein in order to be engaged with and latched into a corresponding latching mechanism of first buckle 48. Webbing loop 58 may include a plastic cover on top of a metal base. Furthermore, it should be noted that, since notch 61 is formed in only one side of first tongue plate 54, first tongue plate 54 may only be inserted into first buckle 48 in one way. This adds in promoting proper wearing of the seat belt, since it is more difficult to improperly twist the seat belt webbing when latching second latch member 46 into second buckle 50, if first latch member 44 is first properly oriented in first buckle 48.

Figure 5:
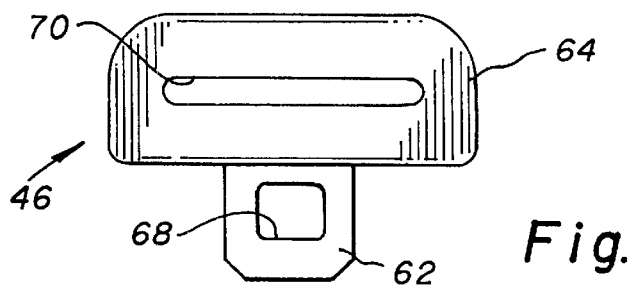
FIG. 5 illustrates a second latch member as used in the instant invention.

Furthermore, in FIG. 2(a), second latch member 46 is illustrated being slidably disposed along webbing 42 between the first and second ends of the seat belt webbing 42. Second latch member 46 is illustrated in FIG. 5. Second latch member 46 includes tongue plate 62 and webbing loop 64. Tongue plate 62 has a center aperture 68 formed therein, which corresponds with and latches into a corresponding latching mechanism of second buckle 50. Webbing loop 64 includes a webbing opening 70 through which seat belt webbing 42 is threaded and slides. Thus, second latch member 46 may slide up and down the length of webbing 42 in order to allow proper application of the three point seat belt by the passenger. First latch member 44 of FIG. 4 is illustrated as being slightly smaller than second latch member 46 of FIG. 5. Of course, it is possible that first latch member 44 may be larger than second latch member 46 or they may be the same size. In FIG. 2(a), it can be seen that first latch member 44, is latched into first buckle 48. As now shown in FIG. 2(b), second latch member 46 has now been latched into second buckle 50, by sliding it along a length of seat belt webbing 42, thus forming shoulder belt 42a and lap belt 42b from seat belt webbing 42. FIGS. 3(a), 3(b) and 3(c) illustrate the procedure of latching the ceiling retractable three point seat belt system in accordance with instant invention. This procedure will be described in more detail below.

Figure 6:
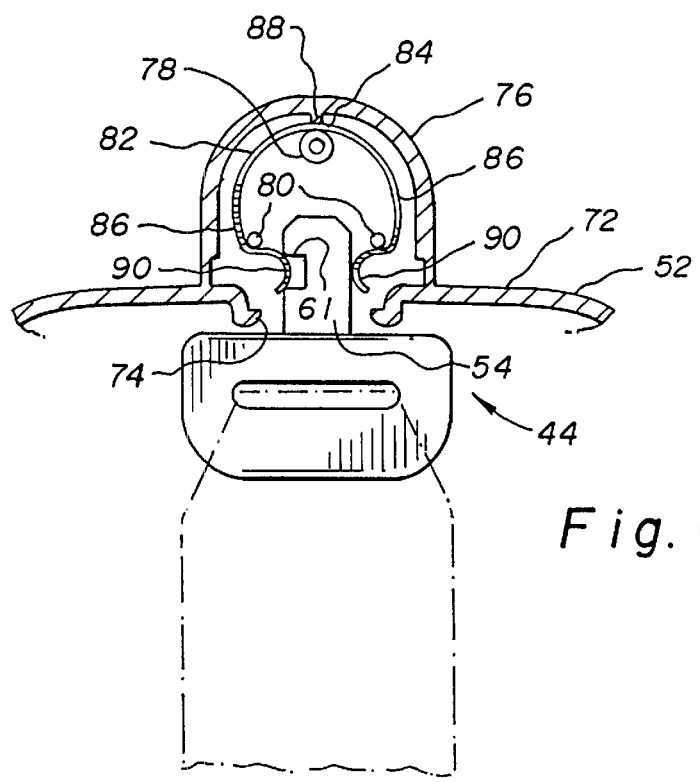
FIG. 6 illustrates the first latch member retained in its stowed position.

FIG. 6 is a cross sectional view of the front portion of belt cover 52 with first latch member 44 in its stowed position.

Belt cover 52 has a front portion 72 with a first slot 74 formed therein. First slot 74 is sufficiently large to allow first tongue plate 54 to be inserted therein. Front portion 72 also has a spring housing 76 formed therein. Spring housing 76 includes a center post 78 and side posts 80 which form a structure for supporting spring clip 82. The bight 84 of spring clip 82 is fitted between center post 78 and projection 88. Each leg 86 of spring clip 82 has an inwardly biased rounded protrusion 90 on the end thereof. Each protrusion 90 is biased against first tongue plate 54 of first latch member 44 when it is in the stowed position. One protrusion 90 engages notch 61 of first tongue plate 54 in order to increase the holding power of spring clip 82. When first latch member 44 is to be removed from its stowed position, a user simply pulls first latch member 44 rearwardly away from the spring clip 82, in order to remove it.

Figure 7:
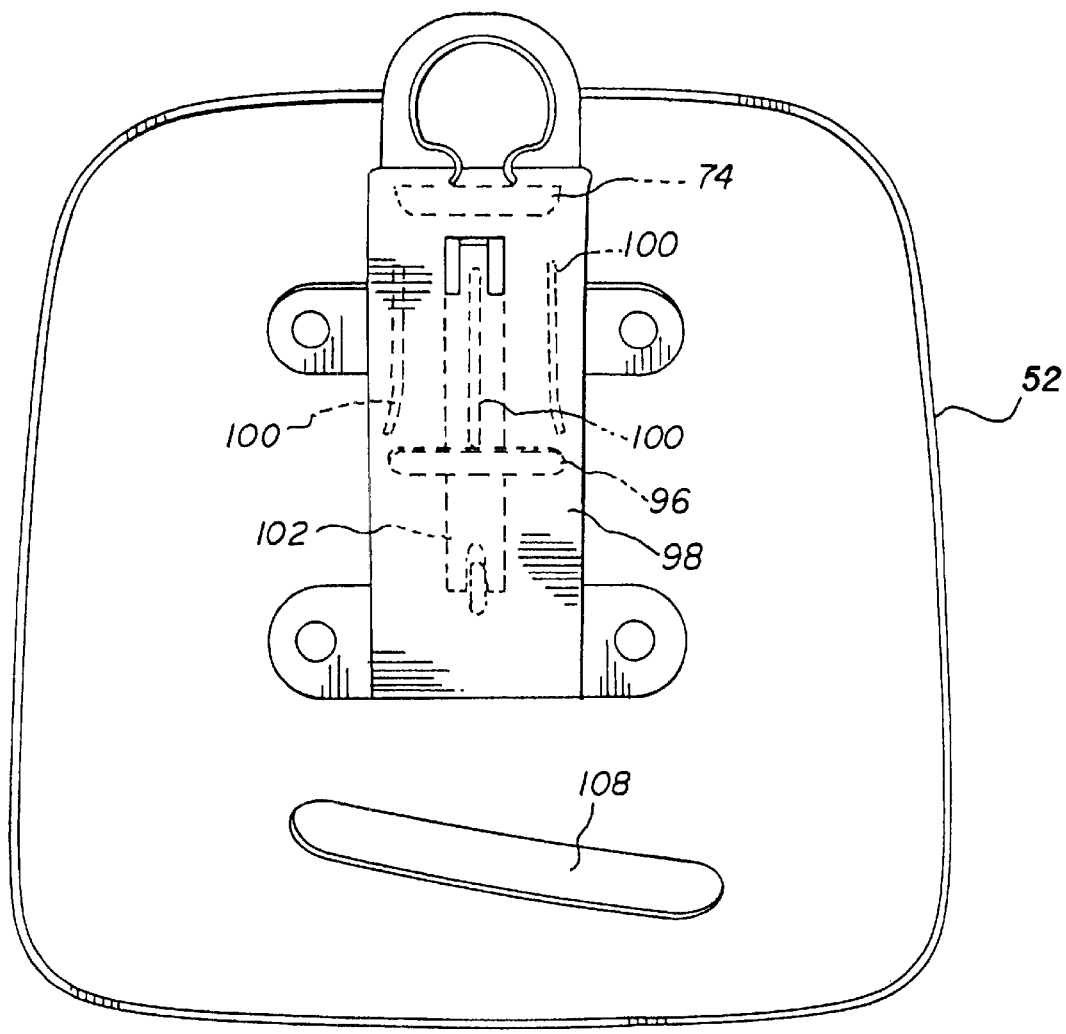
FIG. 7 illustrates a belt cover as viewed from above.
Figure 8:
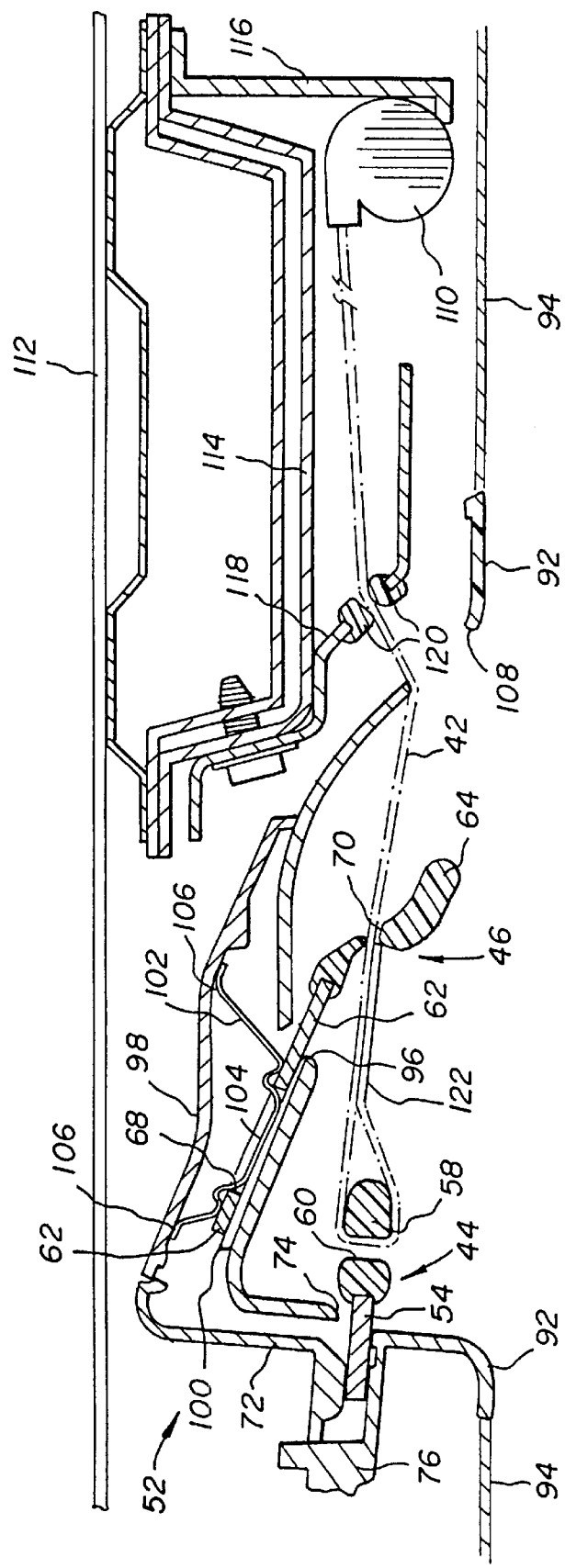
FIG. 8 is a cross sectional view of the belt cover as it is mounted in the ceiling of the motor vehicle.
Figure 9:
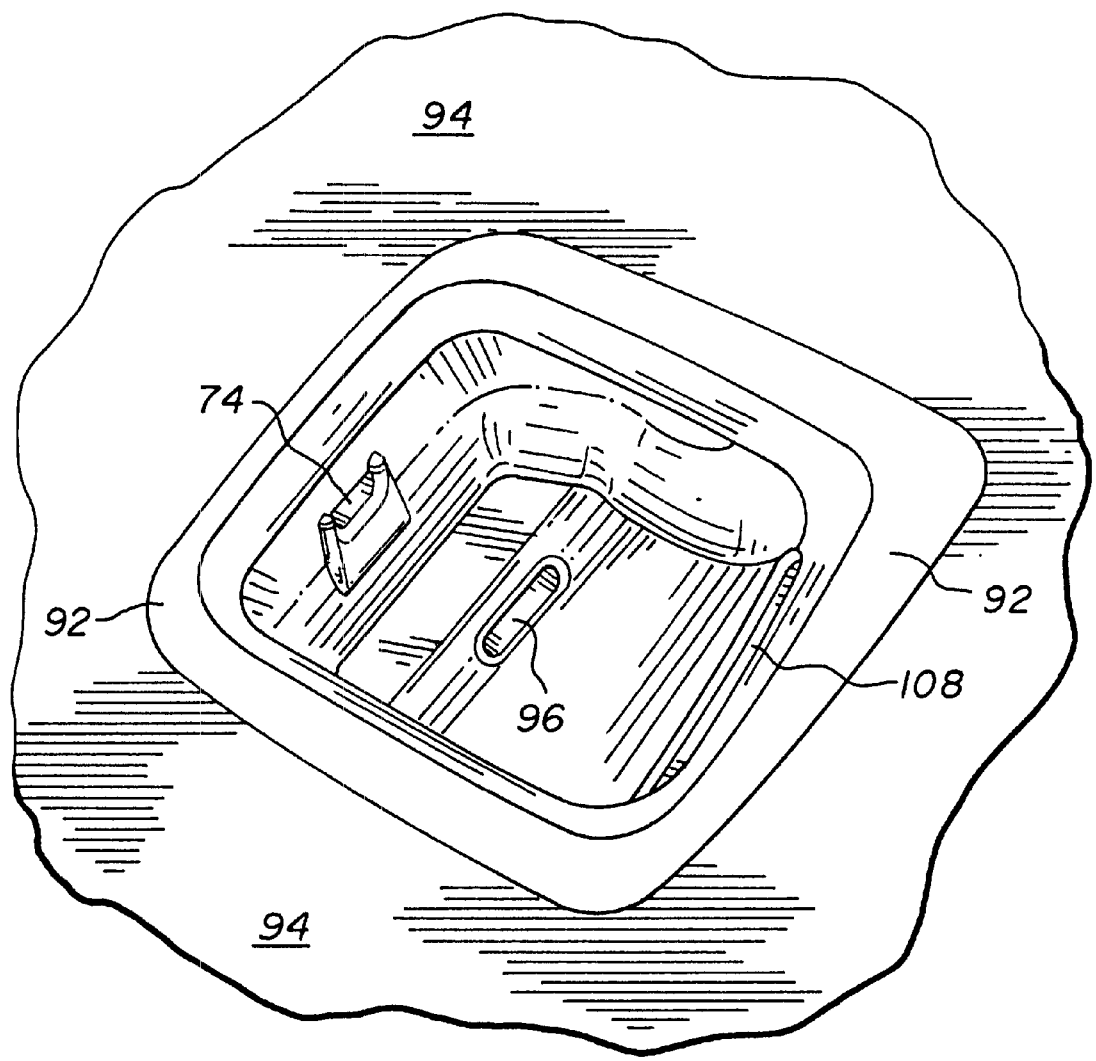
FIG. 9 is a view of the belt cover as seen from the passenger compartment.

FIGS. 7, 8 and 9 illustrate different views of belt cover 52. FIG. 7 illustrates belt cover 52 as viewed from above. FIG. 8 is a cross sectional view of the belt cover 52 installed in a vehicle with both the first latch member 44 and the second latch member 46 in their stowed positions.

FIG. 9 is a view of a belt cover 52 as seen from the passenger's compartment. As best seen in FIG. 8, first slot 74 provides an opening through which first tongue plate 54 of first latch member 44 is inserted. Belt cover 52 includes front portion 72 and spring housing 76. An edge 92 is provided around the lower periphery of belt cover 52. FIG. 6 illustrates how first latch member 44 is held in its stowed position by spring clip 82.

Second tongue plate 62 of second latch member 46 is inserted through second slot 96 of belt cover 52. In FIG. 7, first slot 74 and second slot 96 are indicated in phantom, since they are below upper housing 98 of belt cover 52. When inserted, second tongue plate 62 rides along ridges 100 to its stowed position. Second tongue plate 62 is maintained in its stowed position by second spring clip 102. Second spring clip 102 has a bight 104 which corresponds with center aperture 68 of tongue plate 62. Second spring clip 102 also has legs 106 which are supported against upper housing 98. When second tongue plate 62 of second latch member 46 is slid into place, through second slot 96, center aperture 68 engages bight 104 of second spring clip 102, thus holding second tongue plate 62 and therefore second latch member 46 in place in belt cover 52. When it is desired to remove second latch member 46 from belt cover 52, the user simply pulls on second webbing loop 64, as a handle, and pulls out second tongue plate 62 from its stowed position against a biased force from second spring clip 102.

Third slot 108 is formed at the rearmost portion of belt cover 52. Third slot 108 is larger than first slot 74 or second slot 96. Third slot 108 is an opening through which the seat belt webbing 42 is threaded from a first end secured to retractor 110 to the second end having first latch member 44.

A cross member 114 which extends laterally across the vehicle is attached to vehicle roof 112. A guide bracket 118 is fixed to cross member 114. Guide bracket 118 has a slot with guide edges 120 formed therein for guiding the seat belt webbing 42 from retractor 110 to third slot 108. Retractor 110 is attached to cross member 114 by way of retractor bracket 116. The retractor 110 may be located at any other appropriate position in the vehicle. Belt cover 52 is appropriately attached to the vehicle structure. As illustrated in FIG. 8, the seat belt webbing 42 extends from retractor 110 which may be installed in the ceiling or in any other practical place in the vehicle, past guide edge 120, through third slot 108, through second webbing opening 70, through first webbing opening 60 and overlapping the webbing itself at reference numeral 122. At the overlapping position 122, the seat belt webbing is usually stitched together in order to provide a terminal end, or the second end, of the seat belt. It should be noted that the second webbing opening 70 has an opening width greater than the thickness of one layer of seat belt webbing, in order to allow it to easily slide up and down the length of the webbing, and less than the thickness of two layers of webbing 42. Since second webbing opening 70 has an opening less than the thickness of two layers of webbing 42, second latch member 46 cannot slide all the way down and interfere with first latch member 44. Retractor 110 biases seat belt webbing 42 back toward the retractor itself. Of course, the belt webbing 42 will not completely retract because first latch member 44 and second latch member 46 will not fit through third slot 108 and guide edges 120.

In operation, the ceiling retractable three point seat belt system in accordance with the instant invention is illustrated in FIGS. 3(*a*), 3(*b*) and 3(*c*). In FIG. 3(*a*), a passenger 36 is seated on seat cushion 38 and leaning against seat back 40. Belt cover 52 is located in the ceiling of the vehicle, generally flush with headliner 94 and below roof 112. First buckle 48 extends upwardly between seat cushion 38 and seat back 40. First buckle 48 is anchored to the vehicle structure, such as the vehicle floor, by way of anchor belt 124, anchor plate 126 and anchor bolt 128. Second buckle 50, on the opposite side of the passenger from first buckle 48, is also anchored to vehicle floor 133 by way of anchor belt 130, anchor plate 132 and anchor bolt 134. Second buckle 50 also extends upwardly, from between seat back 40 and seat cushion 38. As illustrated in FIG. 3(*a*) to put on the seat belt, the passenger 36 reaches up and removes first latch member 44 and second latch member 46 from their stowed positions in belt cover 52. Passenger 36 then pulls down first latch member 44 along arrows indicated by reference numerals 136 and latches first tongue plate 54 of first latch member 44 into first buckle 48. This latching state is illustrated in FIG. 3(*b*). As indicated above, first tongue plate 54 of first latch member 44 has a notch 61 formed therein for latching into a corresponding mechanism in first buckle 48.

As illustrated in FIG. 3(*b*), passenger 36 then grasps second latch member 46 and draws it across his body, allowing webbing 42 to slide along second webbing loop 64. The passenger then latches second tongue plate 62 of second latch member 46 into second buckle 50. This creates the final latched state in which the three point seat belt is in position, by creating a shoulder belt 42*a* and a lap belt 42*b* from seat belt webbing 42.

As also indicated above, second tongue plate 62 of second latch member 46 is provided with a center aperture 68, so that it latches into a cooperative mechanism in second buckle 50. Because the shape of first tongue plate 54 is different from the shape of second tongue 62, first latch member 44 can only be latched into first buckle 48 and cannot be latched into second buckle 50. Accordingly, because of the shape of second tongue plate 52, second latch member 46 can only be latched into second buckle 50 and cannot be latched into first buckle 48. Accordingly, it is impossible to improperly latch the three point seat belt of this invention because of inserting and latching either the first or second latch member 44, 46 into the wrong buckle.

When removing the seat belt, the method described above is simply done in reverse. First, the second latch member 46 is unlatched from second buckle 50. Next, the first latch member 44 is unlatched from first buckle 48. Then, as retractor 10 retracts seat belt webbing 42 into the retractor, passenger 36 can insert second latch member 46 into its stowed position in second slot 96 and first latch member 44 into its stowed position in first slot 74. When not in use, the ceiling retractable three point seat belt system according to the instant invention is completely out of the way. Thus, the three point seat belt system in accordance with this invention is convenient to latch, requiring only two latching steps, in the first buckle 48 and in the second buckle 50 in order to properly latch the seat belt It is easy to take off by the reverse method. Furthermore, it is easy to stow by simply stowing the first tongue plate 54 and second tongue plate 62 into the belt cover 52, located in the ceiling.

While the instant invention has been described above as used with a center seat in a vehicle, it may clearly be used with any seat desired.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A ceiling retractable three point seat belt system for restraining a passenger in a vehicle seat, said system comprising:
   a seat belt webbing having a first end connected to a retractor secured to the vehicle;
   a first buckle anchored to the vehicle and disposed on one side of the passenger;
   a second buckle anchored to the vehicle and disposed on an opposite side of the passenger;
   a first latch member connected to a second end of said seat belt webbing, remote from said first end, said first latch member having a first tongue plate engageable with said first buckle;
   a second latch member having a webbing loop through which said seat belt webbing is threaded, such that said second latch member is slidable along said seat belt webbing, from said first latch member toward said retractor, said second latch member having a second tongue plate engageable with said second buckle, and
   a belt cover disposed on a ceiling of the vehicle and having first and second slots, corresponding to said first and second tongue plates, for retaining said first and second tongue plates therein when in a stowed state.

2. The seat belt system of claim 1, wherein said belt cover includes a third slot, through which said seat belt webbing is threaded, said third slot being positioned between said retractor and said first and second latch members.

3. The scat belt system of claim 1, further comprising a first spring clip, adjacent said first slot, engageable with said first tongue plate for retaining said first tongue plate in said first slot in the stowed state.

4. The seat belt system of claim 1, further comprising a second spring clip, adjacent said second slot, engageable with said second tongue plate for retaining said second tongue plate in said second slot in the stowed state.

5. The seat belt system of claim 1, wherein said retractor is mounted in the ceiling of the vehicle.

6. The seat belt system of claim 5, wherein said retractor is mounted to a cross-member in the ceiling of the vehicle.

7. A method of latching a ceiling retractable three point seat belt for restraining a passenger in a vehicle seat, wherein
   a seat belt webbing having a first end is connected to a retractor secured to the vehicle,
   a first buckle anchored to the vehicle is disposed on one side of the passenger,
   a second buckle anchored to the vehicle and is disposed on an opposite side of the passenger,
   a first latch member is connected to a second end of said seat belt webbing, remote from said first end, said first latch member having a first tongue plate engageable with said first buckle,
   a second latch member having a webbing loop through which said seat belt webbing is threaded, such that said second latch member is slidable along said seat belt webbing, from said first latch member toward said retractor, said second latch member having a second tongue plate engageable with said second buckle, and
   a belt cover disposed in the ceiling of the vehicle and having stowage slots for said first and second latch members and a third slot through which said seat belt webbing is threaded to the retractor, said method comprising the steps of:
   pulling said first and second latch members from stowed positions in said belt cover;
   buckling said first latch member into said first buckle by latching said first tongue plate of said first latch member into said first buckle;
   pulling said second latch member across the passenger's body; and
   buckling said second latch member into said second buckle, by latching said second tongue plate of said second latch member into said second buckle.

* * * * *